US010620698B2

(12) United States Patent
Boesen

(10) Patent No.: US 10,620,698 B2
(45) Date of Patent: Apr. 14, 2020

(54) VOICE DICTATION SYSTEMS USING EARPIECE MICROPHONE SYSTEM AND METHOD

(71) Applicant: BRAGI GmbH, München (DE)

(72) Inventor: Peter Vincent Boesen, München (DE)

(73) Assignee: BRAGI GmbH, München (DE)

( * ) Notice: Subject to any disclaimer, the term of this patent is extended or adjusted under 35 U.S.C. 154(b) by 0 days.

(21) Appl. No.: 15/933,847

(22) Filed: Mar. 23, 2018

(65) Prior Publication Data

US 2018/0224931 A1  Aug. 9, 2018

Related U.S. Application Data

(63) Continuation of application No. 15/383,845, filed on Dec. 19, 2016, now Pat. No. 9,939,891.

(Continued)

(51) Int. Cl.
*H04R 1/10*  (2006.01)
*G06F 3/01*  (2006.01)
(Continued)

(52) U.S. Cl.
CPC .............. *G06F 3/012* (2013.01); *G06F 1/163* (2013.01); *G06F 3/017* (2013.01);
(Continued)

(58) Field of Classification Search
CPC ..... G10L 15/26; G06F 3/012; G06F 3/04883; G06F 3/165; G06F 3/017;
(Continued)

(56) References Cited

U.S. PATENT DOCUMENTS 2,325,590 A  8/1943  Carlisle et al.
2,430,229 A  11/1947  Kelsey
(Continued)

FOREIGN PATENT DOCUMENTS

CN  203466953 U  *  3/2014  ............... H04R 1/10
CN  204244472 U     4/2015
(Continued)

OTHER PUBLICATIONS

Jason, "A New Method for Wireless Connectivity in Hearing Aid", The Hearing Journal, October, vol. 63, No. 10, pp. 36-39 (Year: 2001).*
(Continued)

*Primary Examiner* — Leshui Zhang
(74) *Attorney, Agent, or Firm* — Goodhue, Coleman & Owens, P.C.

(57) ABSTRACT

An earpiece for use in voice dictation includes a speaker disposed within the earpiece housing, a microphone, and a processor disposed within the earpiece housing and operatively connected to the microphone and the speaker, wherein the processor is adapted to capture a voice stream from the microphone. The earpiece may further include a wireless transceiver disposed within the earpiece housing, the wireless transceiver operatively connected to the processor. The earpiece is configured to be controlled by a user through a plurality of different user interfaces to perform voice dictation.

9 Claims, 5 Drawing Sheets

Related U.S. Application Data

(60) Provisional application No. 62/270,428, filed on Dec. 21, 2015.

(51) Int. Cl.
  G06F 3/16 (2006.01)
  G06F 3/0488 (2013.01)
  G06F 1/16 (2006.01)
  H04R 3/00 (2006.01)

(52) U.S. Cl.
  CPC .......... *G06F 3/04883* (2013.01); *G06F 3/165* (2013.01); *H04R 1/1041* (2013.01); *H04R 1/1016* (2013.01); *H04R 1/1083* (2013.01); *H04R 3/005* (2013.01); *H04R 2410/05* (2013.01); *H04R 2420/07* (2013.01); *H04R 2460/13* (2013.01)

(58) Field of Classification Search
  CPC .... G06F 2203/0381; G06F 3/16; G06F 3/162; G06F 3/167; G06F 3/60; G06F 3/61; G06F 16/632; G06F 16/634; G06F 16/635; G06F 16/636; G06F 16/637; G06F 16/638; G06F 16/639; G06F 16/64; H04R 1/1016; H04R 1/1041; H04R 1/1058; H04R 1/1083; H04R 2420/07; H04R 2460/13; H04R 25/00; H04R 25/40; H04R 25/402; H04R 25/405; H04R 25/407; H04R 25/43; H04R 25/50; H04R 25/502; H04R 25/505; H04R 25/507; H04R 25/55; H04R 25/552; H04R 25/554; H04R 25/556; H04R 25/558; H04R 25/35; H04R 25/353; H04R 1/10; H04R 5/033
  USPC .......... 700/94; 381/61, 312–331, 74, 56–60; 455/569.1, 575.2
  See application file for complete search history.

(56) References Cited

U.S. PATENT DOCUMENTS

| | | | |
|---|---|---|---|
| 3,047,089 | A | 7/1962 | Zwislocki |
| D208,784 | S | 10/1967 | Sanzone |
| 3,586,794 | A | 6/1971 | Michaelis |
| 3,696,377 | A | 10/1972 | Wall |
| 3,934,100 | A | 1/1976 | Harada |
| 3,983,336 | A | 9/1976 | Malek et al. |
| 4,069,400 | A | 1/1978 | Johanson et al. |
| 4,150,262 | A | 4/1979 | Ono |
| 4,334,315 | A | 6/1982 | Ono et al. |
| D266,271 | S | 9/1982 | Johanson et al. |
| 4,375,016 | A | 2/1983 | Harada |
| 4,588,867 | A | 5/1986 | Konomi |
| 4,617,429 | A | 10/1986 | Bellafiore |
| 4,654,883 | A | 3/1987 | Iwata |
| 4,682,180 | A | 7/1987 | Gans |
| 4,791,673 | A | 12/1988 | Schreiber |
| 4,852,177 | A | 7/1989 | Ambrose |
| 4,865,044 | A | 9/1989 | Wallace et al. |
| 4,984,277 | A | 1/1991 | Bisgaard et al. |
| 5,008,943 | A | 4/1991 | Arndt et al. |
| 5,185,802 | A | 2/1993 | Stanton |
| 5,191,602 | A | 3/1993 | Regen et al. |
| 5,201,007 | A | 4/1993 | Ward et al. |
| 5,201,008 | A | 4/1993 | Arndt et al. |
| D340,286 | S | 10/1993 | Seo |
| 5,280,524 | A | 1/1994 | Norris |
| 5,295,193 | A | 3/1994 | Ono |
| 5,298,692 | A | 3/1994 | Ikeda et al. |
| 5,343,532 | A | 8/1994 | Shugart |
| 5,347,584 | A | 9/1994 | Narisawa |
| 5,363,444 | A | 11/1994 | Norris |
| 5,444,786 | A | 8/1995 | Raviv |
| D367,113 | S | 2/1996 | Weeks |
| 5,497,339 | A | 3/1996 | Bernard |
| 5,606,621 | A | 2/1997 | Reiter et al. |
| 5,613,222 | A | 3/1997 | Guenther |
| 5,654,530 | A | 8/1997 | Sauer et al. |
| 5,692,059 | A | 11/1997 | Kruger |
| 5,721,783 | A | 2/1998 | Anderson |
| 5,748,743 | A | 5/1998 | Weeks |
| 5,749,072 | A | 5/1998 | Mazurkiewicz et al. |
| 5,771,438 | A | 6/1998 | Palermo et al. |
| D397,796 | S | 9/1998 | Yabe et al. |
| 5,802,167 | A | 9/1998 | Hong |
| 5,844,996 | A | 12/1998 | Enzmann et al. |
| D410,008 | S | 5/1999 | Almqvist |
| 5,929,774 | A | 7/1999 | Charlton |
| 5,933,506 | A | 8/1999 | Aoki et al. |
| 5,949,896 | A | 9/1999 | Nageno et al. |
| 5,987,146 | A | 11/1999 | Pluvinage et al. |
| 6,021,207 | A | 2/2000 | Puthuff et al. |
| 6,054,989 | A | 4/2000 | Robertson et al. |
| 6,081,724 | A | 6/2000 | Wilson |
| 6,084,526 | A | 7/2000 | Blotky et al. |
| 6,094,492 | A | 7/2000 | Boesen |
| 6,111,569 | A | 8/2000 | Brusky et al. |
| 6,112,103 | A | 8/2000 | Puthuff |
| 6,157,727 | A | 12/2000 | Rueda |
| 6,167,039 | A | 12/2000 | Karlsson et al. |
| 6,181,801 | B1 | 1/2001 | Puthuff et al. |
| 6,185,152 | B1 | 2/2001 | Shen |
| 6,208,372 | B1 | 3/2001 | Barraclough |
| 6,230,029 | B1 | 5/2001 | Yegiazaryan et al. |
| 6,275,789 | B1 | 8/2001 | Moser et al. |
| 6,339,754 | B1 | 1/2002 | Flanagan et al. |
| D455,835 | S | 4/2002 | Anderson et al. |
| 6,408,081 | B1 | 6/2002 | Boesen |
| 6,424,820 | B1 | 7/2002 | Burdick et al. |
| D464,039 | S | 10/2002 | Boesen |
| 6,470,893 | B1 | 10/2002 | Boesen |
| D468,299 | S | 1/2003 | Boesen |
| D468,300 | S | 1/2003 | Boesen |
| 6,542,721 | B2 | 4/2003 | Boesen |
| 6,560,468 | B1 | 5/2003 | Boesen |
| 6,563,301 | B2 | 5/2003 | Gventer |
| 6,654,721 | B2 | 11/2003 | Handelman |
| 6,664,713 | B2 | 12/2003 | Boesen |
| 6,690,807 | B1 | 2/2004 | Meyer |
| 6,694,180 | B1 | 2/2004 | Boesen |
| 6,718,043 | B1 | 4/2004 | Boesen |
| 6,738,485 | B1 | 5/2004 | Boesen |
| 6,748,095 | B1 | 6/2004 | Goss |
| 6,754,358 | B1 | 6/2004 | Boesen et al. |
| 6,784,873 | B1 | 8/2004 | Boesen et al. |
| 6,823,195 | B1 | 11/2004 | Boesen |
| 6,852,084 | B1 | 2/2005 | Boesen |
| 6,879,698 | B2 | 4/2005 | Boesen |
| 6,892,082 | B2 | 5/2005 | Boesen |
| 6,920,229 | B2 | 7/2005 | Boesen |
| 6,952,483 | B2 | 10/2005 | Boesen et al. |
| 6,987,986 | B2 | 1/2006 | Boesen |
| 7,010,137 | B1 | 3/2006 | Leedom et al. |
| 7,113,611 | B2 | 9/2006 | Leedom et al. |
| D532,520 | S | 11/2006 | Kampmeier et al. |
| 7,136,282 | B1 | 11/2006 | Rebeske |
| 7,203,331 | B2 | 4/2007 | Boesen |
| 7,209,569 | B2 | 4/2007 | Boesen |
| 7,215,790 | B2 | 5/2007 | Boesen et al. |
| D549,222 | S | 8/2007 | Huang |
| D554,756 | S | 11/2007 | Sjursen et al. |
| 7,403,629 | B1 | 7/2008 | Aceti et al. |
| D579,006 | S | 10/2008 | Kim et al. |
| 7,463,902 | B2 | 12/2008 | Boesen |
| 7,508,411 | B2 | 3/2009 | Boesen |
| 7,532,901 | B1 | 5/2009 | LaFranchise et al. |
| D601,134 | S | 9/2009 | Elabidi et al. |
| 7,825,626 | B2 | 11/2010 | Kozisek |
| 7,859,469 | B1 | 12/2010 | Rosener et al. |
| 7,965,855 | B1 | 6/2011 | Ham |
| 7,979,035 | B2 | 7/2011 | Griffin et al. |

(56) References Cited

U.S. PATENT DOCUMENTS

| | | |
|---|---|---|
| 7,983,628 B2 | 7/2011 | Boesen |
| D647,491 S | 10/2011 | Chen et al. |
| 8,095,188 B2 | 1/2012 | Shi |
| 8,108,143 B1 | 1/2012 | Tester |
| 8,140,357 B1 | 3/2012 | Boesen |
| D666,581 S | 9/2012 | Perez |
| 8,300,864 B2 | 10/2012 | Müllenborn et al. |
| 8,406,448 B2 | 3/2013 | Lin |
| 8,430,817 B1 | 4/2013 | Al-Ali et al. |
| 8,436,780 B2 | 5/2013 | Schantz et al. |
| D687,021 S | 7/2013 | Yuen |
| 8,679,012 B1 | 3/2014 | Kayyali |
| 8,719,877 B2 | 5/2014 | VonDoenhoff et al. |
| 8,774,434 B2 | 7/2014 | Zhao et al. |
| 8,831,266 B1 | 9/2014 | Huang |
| 8,891,800 B1 | 11/2014 | Shaffer |
| 8,994,498 B2 | 3/2015 | Agrafioti et al. |
| D728,107 S | 4/2015 | Martin et al. |
| 9,013,145 B2 | 4/2015 | Castillo et al. |
| 9,037,125 B1 | 5/2015 | Kadous |
| D733,103 S | 6/2015 | Jeong et al. |
| 9,081,944 B2 | 7/2015 | Camacho et al. |
| 9,461,403 B2 | 10/2016 | Gao et al. |
| 9,510,159 B1 | 11/2016 | Cuddihy et al. |
| D773,439 S | 12/2016 | Walker |
| D775,158 S | 12/2016 | Dong et al. |
| D777,710 S | 1/2017 | Palmborg et al. |
| 9,544,689 B2 | 1/2017 | Fisher et al. |
| D788,079 S | 5/2017 | Son et al. |
| 9,684,778 B2 | 6/2017 | Tharappel et al. |
| 9,711,062 B2 | 7/2017 | Ellis et al. |
| 9,729,979 B2 | 8/2017 | Özden |
| 9,767,709 B2 | 9/2017 | Ellis |
| 9,848,257 B2 | 12/2017 | Ambrose et al. |
| 2001/0005197 A1 | 6/2001 | Mishra et al. |
| 2001/0027121 A1 | 10/2001 | Boesen |
| 2001/0043707 A1 | 11/2001 | Leedom |
| 2001/0056350 A1 | 12/2001 | Calderone et al. |
| 2002/0002413 A1 | 1/2002 | Tokue |
| 2002/0007510 A1 | 1/2002 | Mann |
| 2002/0010590 A1 | 1/2002 | Lee |
| 2002/0030637 A1 | 3/2002 | Mann |
| 2002/0046035 A1 | 4/2002 | Kitahara et al. |
| 2002/0057810 A1 | 5/2002 | Boesen |
| 2002/0076073 A1 | 6/2002 | Taenzer et al. |
| 2002/0118852 A1 | 8/2002 | Boesen |
| 2003/0002705 A1 | 1/2003 | Boesen |
| 2003/0065504 A1 | 4/2003 | Kraemer et al. |
| 2003/0100331 A1 | 5/2003 | Dress et al. |
| 2003/0104806 A1 | 6/2003 | Ruef et al. |
| 2003/0115068 A1 | 6/2003 | Boesen |
| 2003/0125096 A1 | 7/2003 | Boesen |
| 2003/0218064 A1 | 11/2003 | Conner et al. |
| 2004/0070564 A1 | 4/2004 | Dawson et al. |
| 2004/0102931 A1 | 5/2004 | Ellis et al. |
| 2004/0160511 A1 | 8/2004 | Boesen |
| 2005/0017842 A1 | 1/2005 | Dematteo |
| 2005/0043056 A1 | 2/2005 | Boesen |
| 2005/0094839 A1 | 5/2005 | Gwee |
| 2005/0125320 A1 | 6/2005 | Boesen |
| 2005/0148883 A1 | 7/2005 | Boesen |
| 2005/0165663 A1 | 7/2005 | Razumov |
| 2005/0196009 A1 | 9/2005 | Boesen |
| 2005/0197063 A1 | 9/2005 | White |
| 2005/0212911 A1 | 9/2005 | Marvit et al. |
| 2005/0251455 A1 | 11/2005 | Boesen |
| 2005/0266876 A1 | 12/2005 | Boesen |
| 2006/0029246 A1 | 2/2006 | Boesen |
| 2006/0073787 A1 | 4/2006 | Lair et al. |
| 2006/0074671 A1 | 4/2006 | Farmaner et al. |
| 2006/0074808 A1 | 4/2006 | Boesen |
| 2006/0166715 A1 | 7/2006 | Engelen et al. |
| 2006/0166716 A1 | 7/2006 | Seshadri et al. |
| 2006/0220915 A1 | 10/2006 | Bauer |
| 2006/0258412 A1 | 11/2006 | Liu |
| 2007/0102009 A1 | 5/2007 | Wong et al. |
| 2007/0239225 A1 | 10/2007 | Saringer |
| 2007/0269785 A1 | 11/2007 | Yamanoi |
| 2008/0076972 A1 | 3/2008 | Dorogusker et al. |
| 2008/0090622 A1 | 4/2008 | Kim et al. |
| 2008/0102424 A1 | 5/2008 | Holljes |
| 2008/0146890 A1 | 6/2008 | LeBoeuf et al. |
| 2008/0187163 A1 | 8/2008 | Goldstein et al. |
| 2008/0215239 A1 | 9/2008 | Lee |
| 2008/0253583 A1* | 10/2008 | Goldstein ............ H04R 1/1091 381/92 |
| 2008/0254780 A1 | 10/2008 | Kuhl et al. |
| 2008/0255430 A1 | 10/2008 | Alexandersson et al. |
| 2008/0298606 A1 | 12/2008 | Johnson et al. |
| 2009/0003620 A1 | 1/2009 | McKillop et al. |
| 2009/0008275 A1 | 1/2009 | Ferrari et al. |
| 2009/0017881 A1 | 1/2009 | Madrigal |
| 2009/0041313 A1 | 2/2009 | Brown |
| 2009/0073070 A1 | 3/2009 | Rofougaran |
| 2009/0097689 A1 | 4/2009 | Prest et al. |
| 2009/0105548 A1 | 4/2009 | Bart |
| 2009/0154739 A1 | 6/2009 | Zellner |
| 2009/0191920 A1 | 7/2009 | Regen et al. |
| 2009/0226017 A1 | 9/2009 | Abolfathi et al. |
| 2009/0240947 A1 | 9/2009 | Goyal et al. |
| 2009/0245559 A1 | 10/2009 | Boltyenkov et al. |
| 2009/0261114 A1 | 10/2009 | McGuire et al. |
| 2009/0296968 A1 | 12/2009 | Wu et al. |
| 2009/0303073 A1 | 12/2009 | Gilling et al. |
| 2009/0304210 A1 | 12/2009 | Weisman |
| 2010/0033313 A1 | 2/2010 | Keady et al. |
| 2010/0075631 A1 | 3/2010 | Black et al. |
| 2010/0166206 A1 | 7/2010 | Macours |
| 2010/0203831 A1 | 8/2010 | Muth |
| 2010/0210212 A1 | 8/2010 | Sato |
| 2010/0290636 A1 | 11/2010 | Mao et al. |
| 2010/0320961 A1 | 12/2010 | Castillo et al. |
| 2011/0018731 A1 | 1/2011 | Linsky et al. |
| 2011/0103609 A1 | 5/2011 | Pelland et al. |
| 2011/0137141 A1 | 6/2011 | Razoumov et al. |
| 2011/0140844 A1 | 6/2011 | McGuire et al. |
| 2011/0239497 A1 | 10/2011 | McGuire et al. |
| 2011/0286615 A1 | 11/2011 | Olodort et al. |
| 2011/0293105 A1 | 12/2011 | Arie et al. |
| 2012/0057740 A1 | 3/2012 | Rosal |
| 2012/0155670 A1 | 6/2012 | Rutschman |
| 2012/0159617 A1 | 6/2012 | Wu et al. |
| 2012/0163626 A1 | 6/2012 | Booij et al. |
| 2012/0197737 A1 | 8/2012 | LeBoeuf et al. |
| 2012/0235883 A1 | 9/2012 | Border et al. |
| 2012/0309453 A1 | 12/2012 | Maguire |
| 2013/0106454 A1 | 5/2013 | Liu et al. |
| 2013/0154826 A1 | 6/2013 | Ratajczyk |
| 2013/0178967 A1 | 7/2013 | Mentz |
| 2013/0200999 A1 | 8/2013 | Spodak et al. |
| 2013/0204617 A1 | 8/2013 | Kuo et al. |
| 2013/0293494 A1 | 11/2013 | Reshef |
| 2013/0316642 A1 | 11/2013 | Newham |
| 2013/0346168 A1 | 12/2013 | Zhou et al. |
| 2014/0004912 A1 | 1/2014 | Rajakarunanayake |
| 2014/0014697 A1 | 1/2014 | Schmierer et al. |
| 2014/0020089 A1 | 1/2014 | Perini, II |
| 2014/0072136 A1 | 3/2014 | Tenenbaum et al. |
| 2014/0072146 A1 | 3/2014 | Itkin et al. |
| 2014/0073429 A1 | 3/2014 | Meneses et al. |
| 2014/0079257 A1 | 3/2014 | Ruwe et al. |
| 2014/0106677 A1 | 4/2014 | Altman |
| 2014/0122116 A1 | 5/2014 | Smythe |
| 2014/0146973 A1 | 5/2014 | Liu et al. |
| 2014/0153768 A1 | 6/2014 | Hagen et al. |
| 2014/0163771 A1 | 6/2014 | Demeniuk |
| 2014/0185828 A1 | 7/2014 | Helbling |
| 2014/0219467 A1 | 8/2014 | Kurtz |
| 2014/0222462 A1 | 8/2014 | Shakil et al. |
| 2014/0235169 A1 | 8/2014 | Parkinson et al. |
| 2014/0270227 A1 | 9/2014 | Swanson |
| 2014/0270271 A1 | 9/2014 | Dehe et al. |
| 2014/0276227 A1 | 9/2014 | Pérez |
| 2014/0310595 A1 | 10/2014 | Acharya et al. |

(56) References Cited

U.S. PATENT DOCUMENTS

| | | |
|---|---|---|
| 2014/0321682 A1 | 10/2014 | Kofod-Hansen et al. |
| 2014/0335908 A1 | 11/2014 | Krisch et al. |
| 2014/0348367 A1 | 11/2014 | Vavrus et al. |
| 2015/0028996 A1 | 1/2015 | Agrafioti et al. |
| 2015/0035643 A1 | 2/2015 | Kursun |
| 2015/0036835 A1 | 2/2015 | Chen |
| 2015/0056584 A1 | 2/2015 | Boulware et al. |
| 2015/0110587 A1 | 4/2015 | Hori |
| 2015/0148989 A1 | 5/2015 | Cooper et al. |
| 2015/0181356 A1 | 6/2015 | Krystek et al. |
| 2015/0230022 A1 | 8/2015 | Sakai et al. |
| 2015/0245127 A1 | 8/2015 | Shaffer |
| 2015/0256949 A1 | 9/2015 | Vanpoucke et al. |
| 2015/0264472 A1 | 9/2015 | Aase |
| 2015/0264501 A1 | 9/2015 | Hu et al. |
| 2015/0317565 A1 | 11/2015 | Li et al. |
| 2015/0358751 A1 | 12/2015 | Deng et al. |
| 2015/0359436 A1 | 12/2015 | Shim et al. |
| 2015/0364058 A1 | 12/2015 | Lagree et al. |
| 2015/0373467 A1 | 12/2015 | Gelter |
| 2015/0373474 A1 | 12/2015 | Kraft et al. |
| 2015/0379251 A1 | 12/2015 | Komaki |
| 2016/0033280 A1 | 2/2016 | Moore et al. |
| 2016/0034249 A1 | 2/2016 | Lee et al. |
| 2016/0071526 A1 | 3/2016 | Wingate et al. |
| 2016/0072558 A1 | 3/2016 | Hirsch et al. |
| 2016/0073189 A1 | 3/2016 | Lindén et al. |
| 2016/0094550 A1 | 3/2016 | Bradley et al. |
| 2016/0100262 A1 | 4/2016 | Inagaki |
| 2016/0119737 A1 | 4/2016 | Mehnert et al. |
| 2016/0124707 A1 | 5/2016 | Ermilov et al. |
| 2016/0125892 A1 | 5/2016 | Bowen et al. |
| 2016/0140870 A1 | 5/2016 | Connor |
| 2016/0142818 A1 | 5/2016 | Park |
| 2016/0162259 A1 | 6/2016 | Zhao et al. |
| 2016/0166203 A1* | 6/2016 | Goldstein ............ A61B 5/6817 600/301 |
| 2016/0209691 A1 | 7/2016 | Yang et al. |
| 2016/0253994 A1 | 9/2016 | Panchapagesan et al. |
| 2016/0324478 A1 | 11/2016 | Goldstein |
| 2016/0353196 A1 | 12/2016 | Baker et al. |
| 2016/0360350 A1 | 12/2016 | Watson et al. |
| 2017/0021257 A1 | 1/2017 | Gilbert et al. |
| 2017/0046503 A1 | 2/2017 | Cho et al. |
| 2017/0059152 A1 | 3/2017 | Hirsch et al. |
| 2017/0060262 A1 | 3/2017 | Hviid et al. |
| 2017/0060269 A1 | 3/2017 | Förstner et al. |
| 2017/0061751 A1 | 3/2017 | Loermann et al. |
| 2017/0061817 A1 | 3/2017 | Mettler May |
| 2017/0062913 A1 | 3/2017 | Hirsch et al. |
| 2017/0064426 A1 | 3/2017 | Hviid |
| 2017/0064428 A1 | 3/2017 | Hirsch |
| 2017/0064432 A1 | 3/2017 | Hviid et al. |
| 2017/0064437 A1 | 3/2017 | Hviid et al. |
| 2017/0078780 A1 | 3/2017 | Qian et al. |
| 2017/0078785 A1 | 3/2017 | Qian et al. |
| 2017/0100277 A1 | 4/2017 | Ke |
| 2017/0108918 A1 | 4/2017 | Boesen |
| 2017/0109131 A1 | 4/2017 | Boesen |
| 2017/0110124 A1 | 4/2017 | Boesen et al. |
| 2017/0110899 A1 | 4/2017 | Boesen |
| 2017/0111723 A1 | 4/2017 | Boesen |
| 2017/0111725 A1 | 4/2017 | Boesen et al. |
| 2017/0111726 A1 | 4/2017 | Martin et al. |
| 2017/0111740 A1 | 4/2017 | Hviid et al. |
| 2017/0127168 A1 | 5/2017 | Briggs et al. |
| 2017/0131094 A1 | 5/2017 | Kulik |
| 2017/0142511 A1 | 5/2017 | Dennis |
| 2017/0146801 A1 | 5/2017 | Stempora |
| 2017/0150920 A1 | 6/2017 | Chang et al. |
| 2017/0151085 A1 | 6/2017 | Chang et al. |
| 2017/0151447 A1 | 6/2017 | Boesen |
| 2017/0151668 A1 | 6/2017 | Boesen |
| 2017/0151918 A1 | 6/2017 | Boesen |
| 2017/0151930 A1 | 6/2017 | Boesen |
| 2017/0151957 A1 | 6/2017 | Boesen |
| 2017/0151959 A1 | 6/2017 | Boesen |
| 2017/0153114 A1 | 6/2017 | Boesen |
| 2017/0153636 A1 | 6/2017 | Boesen |
| 2017/0154532 A1 | 6/2017 | Boesen |
| 2017/0155985 A1 | 6/2017 | Boesen |
| 2017/0155992 A1 | 6/2017 | Perianu et al. |
| 2017/0155993 A1 | 6/2017 | Boesen |
| 2017/0155997 A1 | 6/2017 | Boesen |
| 2017/0155998 A1 | 6/2017 | Boesen |
| 2017/0156000 A1 | 6/2017 | Boesen |
| 2017/0164890 A1 | 6/2017 | Leip et al. |
| 2017/0178631 A1 | 6/2017 | Boesen |
| 2017/0180842 A1 | 6/2017 | Boesen |
| 2017/0180843 A1 | 6/2017 | Perianu et al. |
| 2017/0180897 A1 | 6/2017 | Perianu |
| 2017/0188127 A1 | 6/2017 | Perianu et al. |
| 2017/0188132 A1 | 6/2017 | Hirsch et al. |
| 2017/0193978 A1 | 7/2017 | Goldman |
| 2017/0195829 A1 | 7/2017 | Belverato et al. |
| 2017/0208393 A1 | 7/2017 | Boesen |
| 2017/0214987 A1 | 7/2017 | Boesen |
| 2017/0215016 A1 | 7/2017 | Dohmen et al. |
| 2017/0230752 A1 | 8/2017 | Dohmen et al. |
| 2017/0251933 A1 | 9/2017 | Braun et al. |
| 2017/0257698 A1 | 9/2017 | Boesen et al. |
| 2017/0258329 A1 | 9/2017 | Marsh |
| 2017/0263236 A1 | 9/2017 | Boesen et al. |
| 2017/0263376 A1 | 9/2017 | Verschueren et al. |
| 2017/0266494 A1 | 9/2017 | Crankson et al. |
| 2017/0273622 A1 | 9/2017 | Boesen |
| 2017/0280257 A1 | 9/2017 | Gordon et al. |
| 2017/0301337 A1 | 10/2017 | Golani et al. |
| 2017/0361213 A1 | 12/2017 | Goslin et al. |
| 2017/0366233 A1 | 12/2017 | Hviid et al. |
| 2018/0007994 A1 | 1/2018 | Boesen et al. |
| 2018/0008194 A1 | 1/2018 | Boesen |
| 2018/0008198 A1 | 1/2018 | Kingscott |
| 2018/0009447 A1 | 1/2018 | Boesen et al. |
| 2018/0011006 A1 | 1/2018 | Kingscott |
| 2018/0011682 A1 | 1/2018 | Milevski et al. |
| 2018/0011994 A1 | 1/2018 | Boesen |
| 2018/0012228 A1 | 1/2018 | Milevski et al. |
| 2018/0013195 A1 | 1/2018 | Hviid et al. |
| 2018/0014102 A1 | 1/2018 | Hirsch et al. |
| 2018/0014103 A1 | 1/2018 | Martin et al. |
| 2018/0014104 A1 | 1/2018 | Boesen et al. |
| 2018/0014107 A1 | 1/2018 | Razouane et al. |
| 2018/0014108 A1 | 1/2018 | Dragicevic et al. |
| 2018/0014109 A1 | 1/2018 | Boesen |
| 2018/0014113 A1 | 1/2018 | Boesen |
| 2018/0014140 A1 | 1/2018 | Milevski et al. |
| 2018/0014436 A1 | 1/2018 | Milevski |
| 2018/0034951 A1 | 2/2018 | Boesen |
| 2018/0040093 A1 | 2/2018 | Boesen |
| 2018/0042501 A1 | 2/2018 | Adi et al. |

FOREIGN PATENT DOCUMENTS

| | | |
|---|---|---|
| CN | 104683519 A | 6/2015 |
| CN | 104837094 A | 8/2015 |
| EP | 1469659 A1 | 10/2004 |
| EP | 1017252 A3 | 5/2006 |
| EP | 2903186 A1 | 8/2015 |
| GB | 2074817 | 4/1981 |
| GB | 2508226 A | 5/2014 |
| JP | 06292195 | 10/1998 |
| WO | 2008103925 A1 | 8/2008 |
| WO | 2008113053 A1 | 9/2008 |
| WO | 2007034371 A3 | 11/2008 |
| WO | 2011001433 A2 | 1/2011 |
| WO | 2012071127 A1 | 5/2012 |
| WO | 2013134956 A1 | 9/2013 |
| WO | 2014046602 A1 | 3/2014 |
| WO | 2014043179 A3 | 7/2014 |
| WO | 2015061633 A2 | 4/2015 |
| WO | 2015110577 A1 | 7/2015 |

(56) References Cited

FOREIGN PATENT DOCUMENTS

| | | |
|---|---|---|
| WO | 2015110587 A1 | 7/2015 |
| WO | 2016032990 A1 | 3/2016 |
| WO | 2016187869 A1 | 12/2016 |

OTHER PUBLICATIONS

Akkermans, "Acoustic Ear Recognition for Person Identification", Automatic Identification Advanced Technologies, 2005 pp. 219-223.
Alzahrani et al: "A Multi-Channel Opto-Electronic Sensor to Accurately Monitor Heart Rate against Motion Artefact during Exercise", Sensors, vol. 15, No. 10, Oct. 12, 2015, pp. 25681-25702, XP055334602, DOI: 10.3390/s151025681 the whole document.
Announcing the $3,333,333 Stretch Goal (Feb. 24, 2014).
Ben Coxworth: "Graphene-based ink could enable low-cost, foldable electronics", "Journal of Physical Chemistry Letters", Northwestern University, (May 22, 2013).
Blain: "World's first graphene speaker already superior to Sennheiser MX400", htt://www.gizmag.com/graphene-speaker-beats-sennheiser-mx400/31660, (Apr. 15, 2014).
BMW, "BMW introduces BMW Connected—The personalized digital assistant", "http://bmwblog.com/2016/01/05/bmw-introduces-bmw-connected-the-personalized-digital-assistant", (Jan. 5, 2016).
BRAGI Is on Facebook (2014).
BRAGI Update—Arrival of Prototype Chassis Parts—More People—Awesomeness (May 13, 2014).
BRAGI Update—Chinese New Year, Design Verification, Charging Case, More People, Timeline(Mar. 6, 2015).
BRAGI Update—First Sleeves From Prototype Tool—Software Development Kit (Jun. 5, 2014).
BRAGI Update—Let's Get Ready to Rumble, A Lot to Be Done Over Christmas (Dec. 22, 2014).
BRAGI Update—Memories From April—Update on Progress (Sep. 16, 2014).
BRAGI Update—Memories from May—Update on Progress—Sweet (Oct. 13, 2014).
BRAGI Update—Memories From One Month Before Kickstarter—Update on Progress (Jul. 10, 2014).
BRAGI Update—Memories From the First Month of Kickstarter—Update on Progress (Aug. 1, 2014).
BRAGI Update—Memories From the Second Month of Kickstarter—Update on Progress (Aug. 22, 2014).
BRAGI Update—New People @BRAGI—Prototypes (Jun. 26, 2014).
BRAGI Update—Office Tour, Tour to China, Tour to CES (Dec. 11, 2014).
BRAGI Update—Status on Wireless, Bits and Pieces, Testing-Oh Yeah, Timeline(Apr. 24, 2015).
BRAGI Update—The App Preview, The Charger, The SDK, BRAGI Funding and Chinese New Year (Feb. 11, 2015).
BRAGI Update—What We Did Over Christmas, Las Vegas & CES (Jan. 19, 2014).
BRAGI Update—Years of Development, Moments of Utter Joy and Finishing What We Started(Jun. 5, 2015).
BRAGI Update—Alpha 5 and Back to China, Backer Day, On Track(May 16, 2015).
BRAGI Update—Beta2 Production and Factory Line(Aug. 20, 2015).
BRAGI Update—Certifications, Production, Ramping up.
BRAGI Update—Developer Units Shipping and Status(Oct. 5, 2015).
BRAGI Update—Developer Units Started Shipping and Status (Oct. 19, 2015).
BRAGI Update—Developer Units, Investment, Story and Status(Nov. 2, 2015).
BRAGI Update—Getting Close(Aug. 6, 2015).
BRAGI Update—On Track, Design Verification, How It Works and What's Next(Jul. 15, 2015).
BRAGI Update—On Track, On Track and Gems Overview.
BRAGI Update—Status on Wireless, Supply, Timeline and Open House@BRAGI(Apr. 1, 2015).
BRAGI Update—Unpacking Video, Reviews on Audio Perform and Boy Are We Getting Close(Sep. 10, 2015).
Healthcare Risk Management Review, "Nuance updates computer-assisted physician documentation solution" (Oct. 20, 2016).
Hoffman, "How to Use Android Beam to Wirelessly Transfer Content Between Devices", (Feb. 22, 2013).
Hoyt et. al., "Lessons Learned from Implementation of Voice Recognition for Documentation in the Military Electronic Health Record System", The American Health Information Management Association (2017).
Hyundai Motor America, "Hyundai Motor Company Introduces a Health + Mobility Concept for Wellness in Mobility", Fountain Valley, California (2017).
International Search Report & Written Opinion, PCT/EP16/70245 (dated Nov. 16, 2016).
International Search Report & Written Opinion, PCT/EP2016/070231 (dated Nov. 18, 2016).
International Search Report & Written Opinion, PCT/EP2016/070247 (dated Nov. 18, 2016).
International Search Report & Written Opinion, PCT/EP2016/07216 (dated Oct. 18, 2016).
International Search Report and Written Opinion, PCT/EP2016/070228 (dated Jan. 9, 2017).
Jain A et al: "Score normalization in multimodal biometric systems", Pattern Recognition, Elsevier, GB, vol. 38, No. 12, Dec. 31, 2005, pp. 2270-2285, XP027610849, ISSN: 0031-3203.
Last Push Before the Kickstarter Campaign Ends on Monday 4pm CET (Mar. 28, 2014).
Lovejoy: "Touch ID built into iPhone display one step closer as third-party company announces new tech", "http://9to5mac.com/2015/07/21/virtualhomebutton/" (Jul. 21, 2015).
Nemanja Paunovic et al, "A methodology for testing complex professional electronic systems", Serbian Journal of Electrical Engineering, vol. 9, No. 1, Feb. 1, 2012, pp. 71-80, XPO55317584, YU.
Nigel Whitfield: "Fake tape detectors, 'from the stands' footie and UGH? Internet of Things in my set-top box"; http://www.theregister.co.uk/2014/09/24/ibc_round_up_object_audio_dlna_iot/ (Sep. 24, 2014).
Nuance, "ING Netherlands Launches Voice Biometrics Payment System in the Mobile Banking App Powered by Nuance", "https://www.nuance.com/about-us/newsroom/press-releases/ing-netherlands-launches-nuance-voice-biometrics.html", 4 pages (Jul. 28, 2015).
Staab, Wayne J., et al., "A One-Size Disposable Hearing Aid is Introduced", The Hearing Journal 53(4):36-41) Apr. 2000.
Stretchgoal—It's Your Dash (Feb. 14, 2014).
Stretchgoal—The Carrying Case for the Dash (Feb. 12, 2014).
Stretchgoal—Windows Phone Support (Feb. 17, 2014).
The Dash + The Charging Case & The BRAGI News (Feb. 21, 2014).
The Dash—A Word From Our Software, Mechanical and Acoustics Team + An Update (Mar. 11, 2014).
Update From BRAGI—$3,000,000—Yipee (Mar. 22, 2014).
Weisiger; "Conjugated Hyperbilirubinemia", Jan. 5, 2016.
Wertzner et al., "Analysis of fundamental frequency, jitter, shimmer and vocal intensity in children with phonological disorders", V. 71, n.5, 582-588, Sep./Oct. 2005; Brazilian Journal of Othrhinolaryngology.
Wikipedia, "Gamebook", https://en.wikipedia.org/wiki/Gamebook, Sep. 3, 2017, 5 pages.
Wikipedia, "Kinect", "https://en.wikipedia.org/wiki/Kinect", 18 pages, (Sep. 9, 2017).
Wikipedia, "Wii Balance Board", "https://en.wikipedia.org/wiki/Wii_Balance_Board", 3 pages, (Jul. 20, 2017).

\* cited by examiner

VOICE DICTATION SYSTEMS USING EARPIECE MICROPHONE SYSTEM AND METHOD

PRIORITY STATEMENT

This application claims priority to U.S. patent application Ser. No. 15/383,845 filed Dec. 19, 2016, which claims priority to U.S. Provisional Patent Application 62/270,428, filed on Dec. 21, 2015, and entitled Voice Dictation Systems using Earpiece Microphone System and Method, hereby incorporated by reference in its entirety.

FIELD OF THE INVENTION

The present invention relates to wearable devices. More particularly, but not exclusively, the present invention relates to voice dictation systems using ear pieces.

BACKGROUND

The use of voice to text dictation systems has slowly but steadily seen growth over the last ten years. What was a niche product is now starting to gain traction in multiple industries, including medicine, law, accounting, sales among others. However, the system is still extremely cumbersome and frustrating. Due to issues relating to articulation errors, background and ambient noise, difficulty with single phonemes as well as linkages into the receptor computer, voice to text dictation systems have yet to fully reveal their great promise. There are several factors that continue to pose challenges from a work flow and logistics standpoint. Chief among these factors is the microphone system currently required to provide the inputs into the voice engine. A wired, handheld microphone is still seen as the highest quality input device; this necessarily limits the accessibility of the device and its overall capability for utilization. Further, such microphones are relatively heavy, require the use of manual input controls and require placement near the mouth for optimal input quality. All of these factors contribute to the fatigue that the user generally experiences with such input systems.

Beyond these limitations, others exist. The dictation system has difficulty interpreting the natural flow of free speech; one must train their voice to follow the cadence optimization for the most accurate interpretation of the voice engine. In some cases, this optimization is seen in a colorimetric bar which responds to the vocal inputs in a real time fashion. This feedback is reasonable, but serves to introduce vocal strain on the part of the user. Such strain in detectable after use of the system for some time, and oftentimes does not significantly improve over time. Vocal fatigue involves a shift in the user's fundamental frequency (F0), and can progress to persistent hoarseness. What is needed is a new system that provides pure, digitized speech from the user's ear canal that is free from environmental noise, allowing the maximal optimization of the voice engine in order to increase the speed and accuracy of the voice speech to text. Such a system should preferably be wireless and allow for multiple methodologies for activation and deactivation of the input to the speech engine.

SUMMARY

Therefore, it is a primary object, feature, or advantage of the present invention to improve over the state of the art.

It is a further object, feature, or advantage of the present invention to provide an earpiece sensor for voice production located at or within the external auditory canal of the user.

It is still further object, feature, or advantage of the present invention to provide the ability to powerfully sense the self-voice.

Another object, feature, or advantage of the present invention is to limit the level and effect of background noise to optimize the speech to text engine for rapid interpretation of the input speech.

Yet another object, feature, or advantage of the present invention is to provide for enhanced control functions for interfacing the text to speech function within the document work product.

A further object, feature, or advantage is to allow for handsfree capability for speech to text input into a document work product.

A still further object, feature, or advantage is to allow for accelerometer based inputs for control of the text to speech input engine. For example, a nod of the head upward might initiate the ear canal microphone input, whereas a nod of the head downward might pause the ear canal microphone input.

Another object, feature, or advantage is to allow for specific placement of a voice snippet within a document.

Yet another object, feature, or advantage is to allow for a voice snippet to remain in its location in a document until final editing and sign off has been achieved. This allows final edits to completed with the advantage of the original voice input for comparison. Corrections from voice snippets may then be used to further enhance voice engine accuracy over time.

It is a further object, feature, or advantage of the present invention to provide for accurate accuracy in the voice capture of a user of a wearable device.

It is a still further object, feature, or advantage of the present invention to markedly improve data capture from a wearable user due to isolation of the bone microphone.

Another object, feature, or advantage is to acquire patient voice signals in real time, using an external facing microphone to detect patient voice inputs.

Yet another object, feature, or advantage is to allow for instantaneous voice to text conversion.

A further object, feature, or advantage is to allow for capture of a voice snippet at a position within a document.

A still further object, feature, or advantage to allow for editing and correction of incorrect segments of the voice to text conversion.

Another object, feature, or advantage is to allow for standard edits to other non-voice sections of a document.

Yet another object, feature, or advantage is to allow for insertion of voice to text snippets at the direction of the primary user, in this case the health care provider.

A further object, feature, or advantage is to allow for the capture of the patient encounter at the point of service, greatly improving accuracy while simultaneously saving time and money.

A still further object, feature, or advantage is to reduce healthcare administrative costs.

One or more of these and/or other objects, features, or advantages of the present invention will become apparent from the specification and claims that follow. No single embodiment need provide each and every object, feature, or advantage. Different embodiments may have different objects, features, or advantages. Therefore, the present invention is not to be limited to or by an objects, features, or advantages stated herein.

A new and novel system is provided utilizing a wireless, in the ear canal earpiece that allows for multiple input controls, whether by voice, control via touch screen, taps on the lateral aspect of the device at its input center, or through a novel use of accelerometer based controls. Such controls would have the advantages of allowing the user to remain completely hands free while able to control the various functions required of the vocal input. All of these controls may be optimized to increase the accuracy of the voice engine at natural language speeds in order to limit the fundamental frequency shifts seen in previous generation devices. These systems would be tailored to the individual business units that they serve, allowing for desktop input, field input, boardroom input and bedside input to name but a few. Such industries include law, insurance, medical, construction, government, financial, telecommunications, technology among many others.

According to one aspect, an earpiece for use in voice dictation is provided. The earpiece includes a speaker disposed within the earpiece housing, a microphone, and a processor disposed within the earpiece housing and operatively connected to the microphone and the speaker, wherein the processor is adapted to capture a voice stream from the microphone. The system further includes a wireless transceiver disposed within the earpiece housing, the wireless transceiver operatively connected to the processor. The earpiece is configured to be controlled by a user through a plurality of different user interfaces to perform voice dictation.

According to another aspect, a method for voice dictation includes providing an earpiece, the earpiece including an earpiece housing, a speaker disposed within the earpiece housing, a microphone, a processor disposed within the earpiece housing and operatively connected to the microphone and the speaker, wherein the processor is adapted to capture a voice stream from the microphone, and a wireless transceiver disposed within the earpiece housing, the wireless transceiver operatively connected to the processor. The method further includes capturing a voice audio stream using the microphone, receiving input from a first interface of the earpiece, and interpreting the input from the first interface by the processor, and receiving input from a second interface of the earpiece, and interpreting the input from the second interface by the processor.

According to one aspect, a system for voice dictation is provided. The system includes an earpiece. The earpiece includes an earpiece housing sized to fit into an external auditory canal of a user and block the external auditory canal, a first microphone operatively connected to the earpiece housing and positioned to be isolated from ambient sound when the earpiece housing is fitted into the external auditory canal, a second microphone operatively connected to earpiece housing and positioned to sound external from the user, and a processor disposed within the earpiece housing and operatively connected to the first microphone and the second microphone. The processor is adapted to capture a first voice audio stream using at least the first microphone, the first voice audio stream associated with the user, and a second voice audio stream using at least the second microphone, the second voice audio stream associated with a person other than the user. The system may also include a software application executing on a computing device which provides for receiving the first voice audio stream into a first position of a record and receiving the second voice audio stream into a second position of the record.

According to another aspect, a method for voice dictation is provided. The method includes providing an earpiece, the earpiece having an earpiece housing sized to fit into an external auditory canal of a user and block the external auditory canal, a first microphone operatively connected to the earpiece housing and positioned to be isolated from ambient sound when the earpiece housing is fitted into the external auditory canal, a second microphone operatively connected to earpiece housing and positioned to sound external from the user; and a processor disposed within the earpiece housing and operatively connected to the first microphone and the second microphone. The processor is adapted to capture a first voice audio stream using at least the first microphone, the first voice audio stream associated with the user, and a second voice audio stream using at least the second microphone, the second voice audio stream associated with a person other than the user. The method further includes capturing a first voice audio stream using at least the first microphone, the first voice audio stream associated with the user, storing the first voice audio stream on a machine readable storage medium, converting the first voice audio stream to text, placing the text within a first form field in a software application, and providing access to the first voice audio stream through the software application.

DETAILED DESCRIPTION

Figure 1:
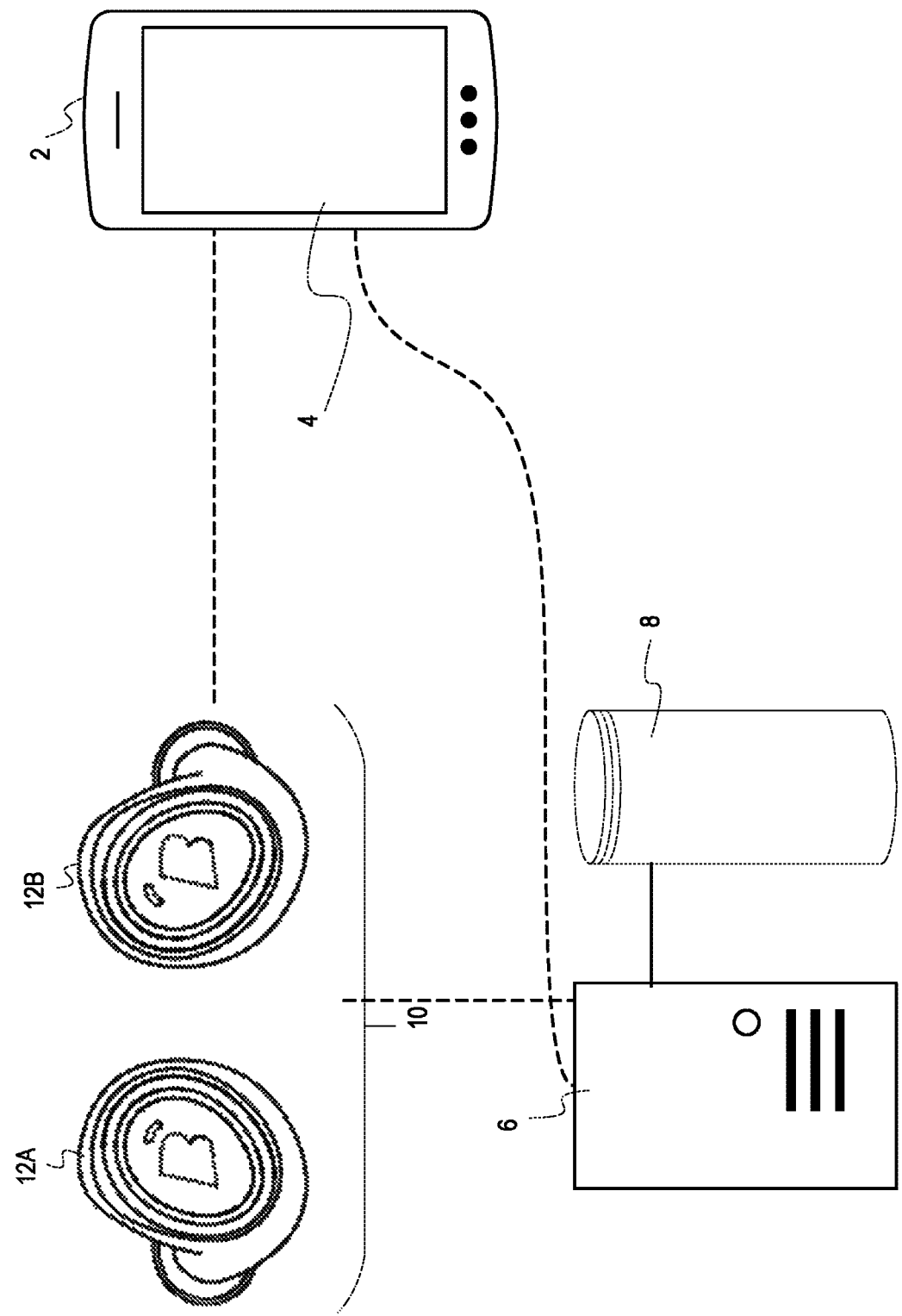
FIG. 1 illustrates one example of a system.

FIG. 1 illustrates one example of a system. As shown in FIG. 1 there are one or more earpieces 10 such as a left earpiece 12A and a right earpiece 12B. Although multiple earpieces are shown, only a single earpiece may be used. The earpieces 12A, 12B may be in operative communication with a computing device 2. The computing device 2 may be a computer, a mobile device such as a phone or tablet, or other type of computing device. There may be a display 4 associated with the computing device 2. A server 6 is also shown. The server 6 is in operative communication with a data store 8 such as a database. The server 6 may be a cloud-based server, a physical server, a virtual server executing on a hardware platform, or other type of server.

Figure 2:
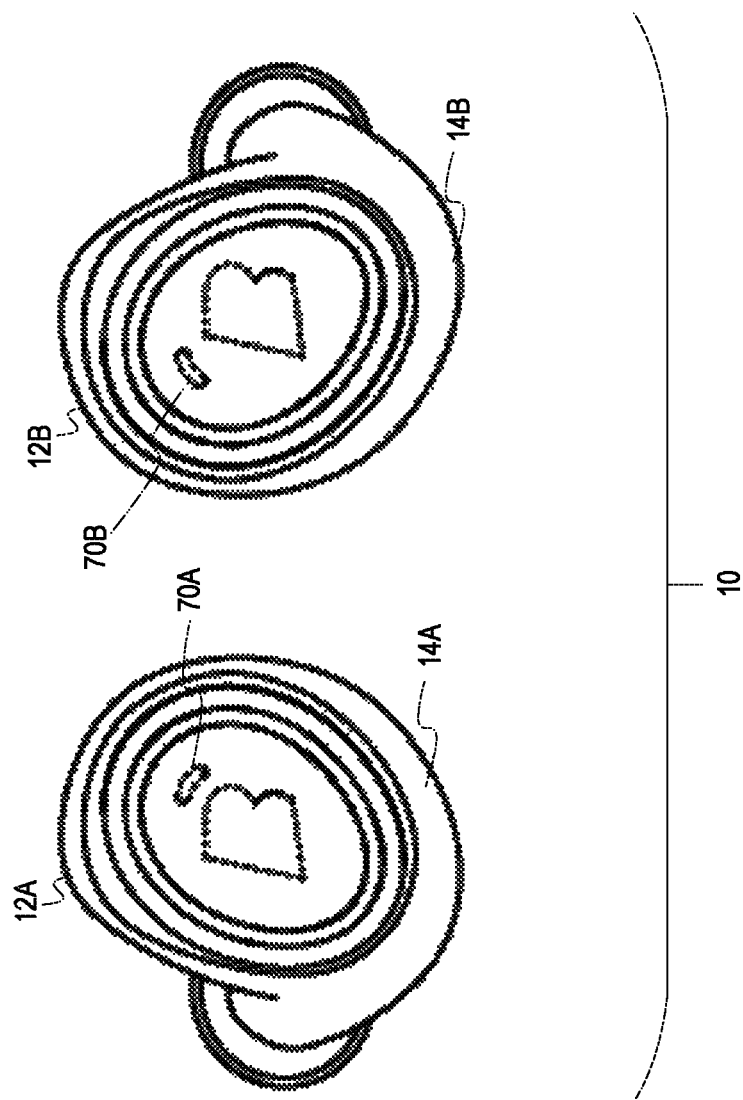
FIG. 2 illustrates a set of earpieces in greater detail.

FIG. 2 illustrates a set of earpieces 10 in greater detail. A left earpiece 12A is housed within an earpiece housing 14A. The left earpiece 12A includes an outward facing microphone 70A. The right earpiece 12B is housed within an earpiece housing 14B. The right earpiece 12B includes an outward facing microphone 70B. The earpieces may be the earpieces which are commercially available from Bragi GmbH with modified software to perform functions described herein.

Figure 3:
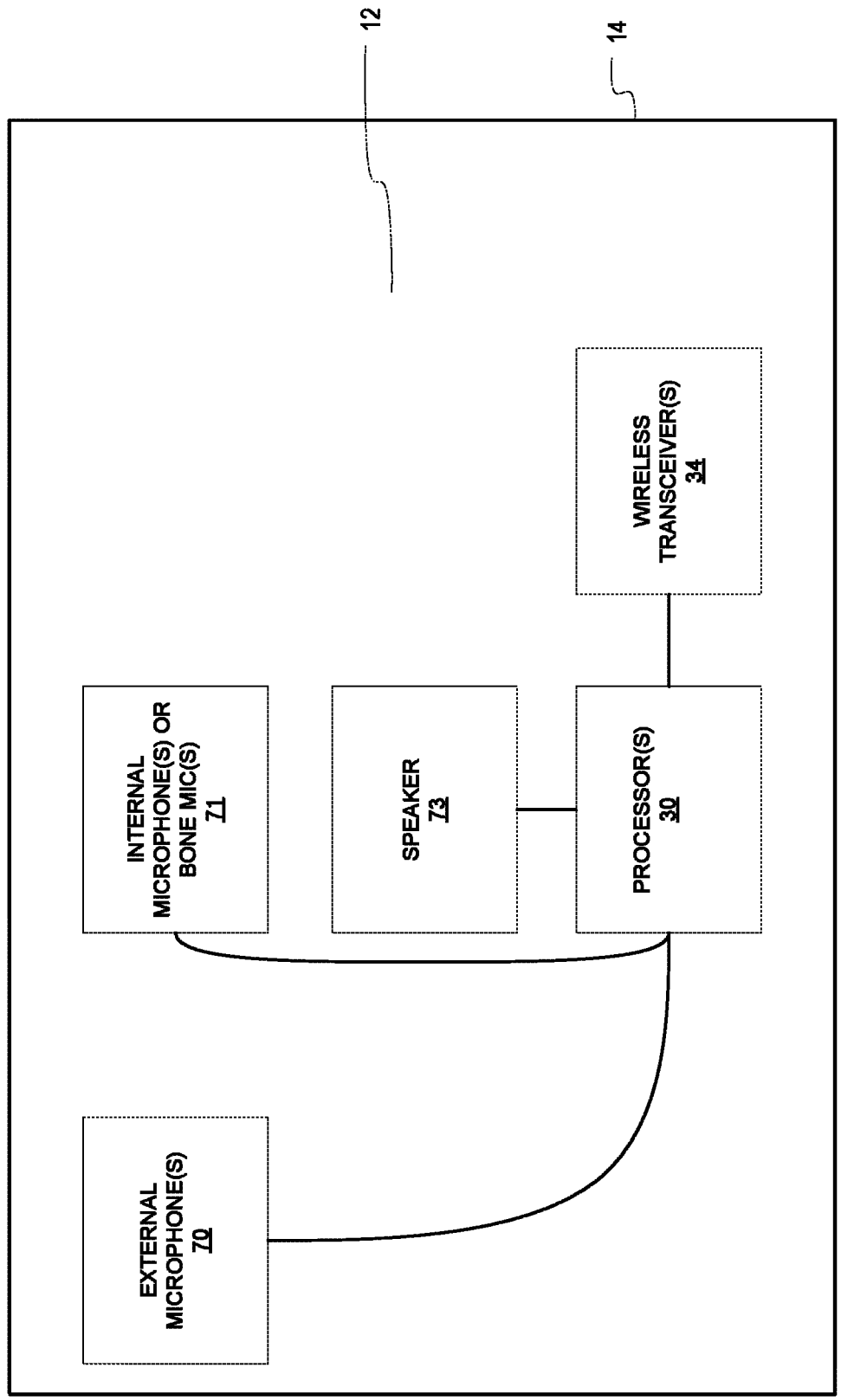
FIG. 3 illustrates a block diagram of one of the earpieces.

FIG. 3 illustrates a block diagram of one of the earpieces 12. The earpiece 12 has an earpiece housing 14. Disposed within the earpiece housing is at least one processor 30. The processor 30 is operatively connected to at least one wireless transceiver 34 which may include a radio transceiver capable of communications using Bluetooth, BLE, WiFi, or other type of radio communication. One or more external microphones 70 and one or more internal microphones 71 are also operatively connected to the processor 30. In addition, a speaker 73 is operatively connected to the processor 30. Note that the external microphone(s) 70 may be positioned in order to detect or capture voice streams associated with one or more speakers other than the person wearing the earpiece (the user). The one or more internal microphones 71 may be, for example, positioned at or near the external auditory canal or mastoid bone of the user and may provide for picking-up bone vibrations or are otherwise configured to pickup frequency ranges associated with the person wearing the earpiece.

Figure 4:
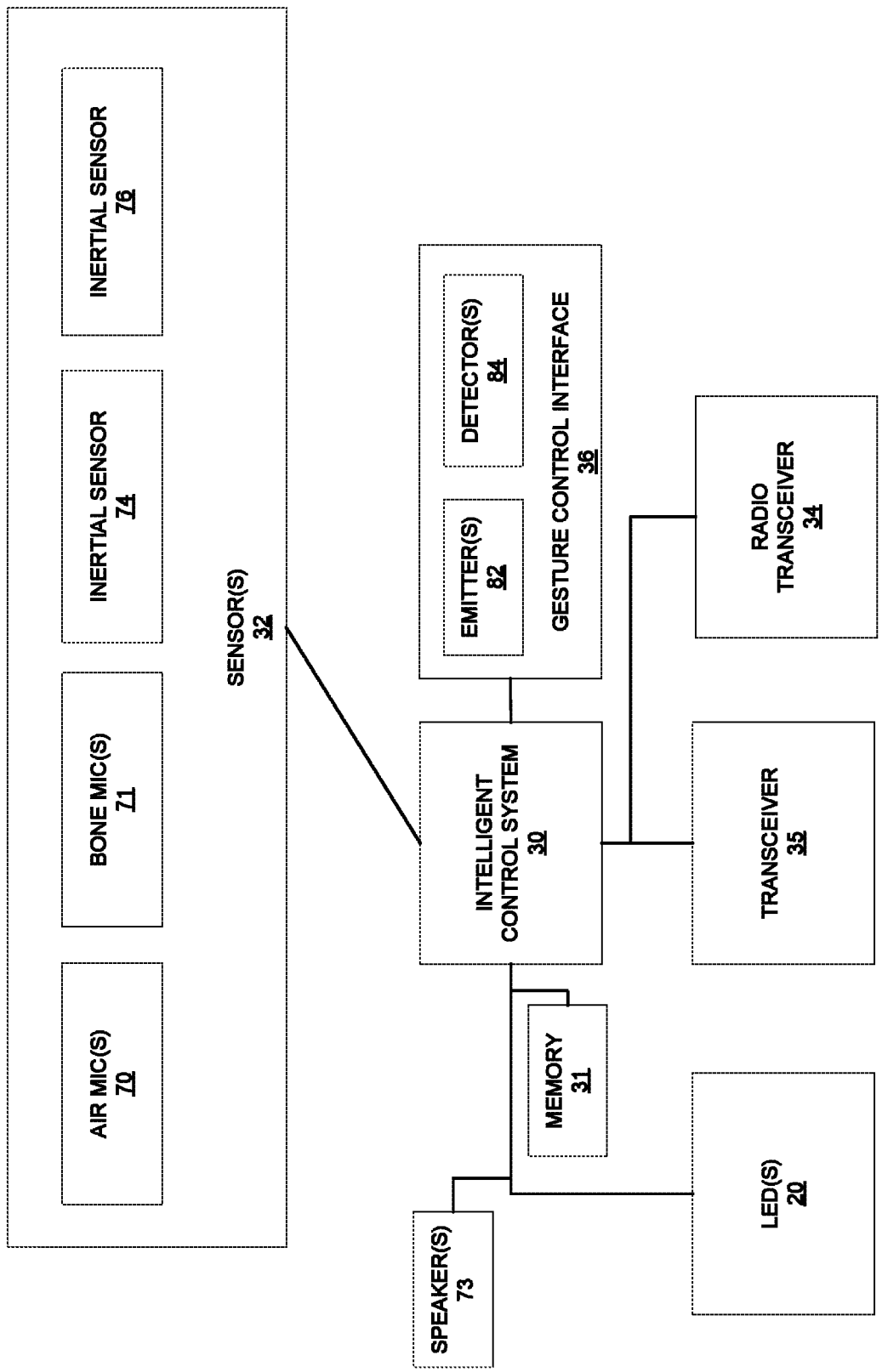
FIG. 4 illustrates another example of a block diagram of one of the earpieces.

FIG. 4 illustrates another example of an earpiece in more detail. The earpieces includes an intelligent control system 30 which may include one or more processors. There are one or more sensors 32 which are operatively connected to the intelligent control system (or one or more processors within the intelligent control system 30). Examples of sensors 32 may include an air microphone 70, a bone microphone 71, an inertial sensor 74, and an inertial sensor 76. Note that the bone microphone 71 may be different from the air microphone 70 in that the frequency response is selected to better pick-up bone conduction vibrations such as those associated with speech of a user of the earpiece. In addition, the bone microphone 71 may be positioned to better pick-up bone vibrations, such as being positioned proximate the mastoid or jaw bone or positioned within the external auditory canal. Having both a microphone 70 and a bone microphone 71 may be advantageous for various reasons when the earpiece is being used for dictation. For example, the microphone 70 may be preferentially configured for detecting ambient sounds including the speech of those other than the user whereas the bone microphone may be positioned and configured to preferentially detect speech of the user. Thus, a signal from the bone microphone 71 may be used or signal processing may use signals from both the air microphone and bone microphone in order to improve quality of the speech signal associated with voice dictation.

One or more inertial sensors 74, 76 are also provided. The inertial sensor(s) 74, 76 may be used as a part of one form of user interface as later explained herein. One or more speakers 73 are operatively connected to the intelligent control system 30. One or more light emitting diodes 20 may also be operatively connected to the intelligent control system 30. One or more transceivers 34, 35 may also be operatively connected to the intelligent control system 30 (which may include one or more processors). The transceivers may include a radio transceiver 34 such as Bluetooth, BLE, WiFi, UWB, or other type of radio transceiver. It is noted that one type of transceiver such as a near field magnetic induction (NFMI) transceiver may be used to connect an earpiece to a second earpiece or other wearable device while another type of transceiver such as a radio may be used to connect the earpiece to a mobile phone, tablet computer, or other computing device which may include a display.

A gesture control interface 36 may also be operatively connected to the intelligent control system 30 (or one or more processors associated therewith). The gesture control user interface 36 may include one or more emitters 82 and one or more detectors 84. The gesture control user interface may emit a field and then detect changes in the field such as caused by a user's interaction within the field. Thus, the gesture control user interface may detect gestures as performed by a user. This may include gestures such as a single tap on the earpiece housing, a double tap on the earpiece housing, a swipe in a first direction across the earpiece housing, a swipe in a second direction across the earpiece housing, a hold (a tap of sustained duration) on the earpiece housing, or other type of gesture. Various technologies may be used for the gesture control user interface including infrared emitters and detectors, ultrasonic emitters and detectors, or other types of emitters and detectors. The gesture control interface 36 may detect gestures made against an outer surface of the earpiece housing or near the earpiece housing.

Therefore, it to be understood that the earpiece may include multiple forms or sets of input controls, or multiple user interfaces. For example, a first type of user interface may be a voice interface. When the voice interface is used, a user may speak and a voice signal is directed by the bone microphone 71 and or the air microphone 70 or both. Thus, the voice interface may be used not only to provide speech to be transcribed but also to control the interface. Certain words or phrases may be reserved by the system as voice commands or may be viewed as commands when contextual indicators indicate that they are being used as voice commands. In addition, the voice interface may be accessed by saying a particular word or phrase, for example, "Bragi", "Hey Bragi", "OK Bragi" or other such command. In addition, the voice interface may provide for communicating audio to one or more speakers 73 of the earpiece. For example, the earpiece may ask questions of the user to confirm statements made.

Another example of a type of user interface which may be used is the inertial sensors 74, 76. For example, instead of giving verbal feedback through a voice interface, a user may provide feedback through movement. Thus, for example, an audio message such as "Are you ready to dictate?", a user may nod their head in an up and down manner to indicate "Yes" or alternatively a use may move their head back and forth to indicate "No." Similarly, a list of options or a menu or other hierarchical structure may be presented where a user may select options through head movement. Note that this type of user interface may be advantageous over one where a user provides input to control dictation via voice where the user is engaged with others. Thus, the user can control voice dictation functions without actually speaking or to speak only to activate a menu function. Software to perform such functions may be stored on a machine readable storage medium such as memory 31.

Figure 5:
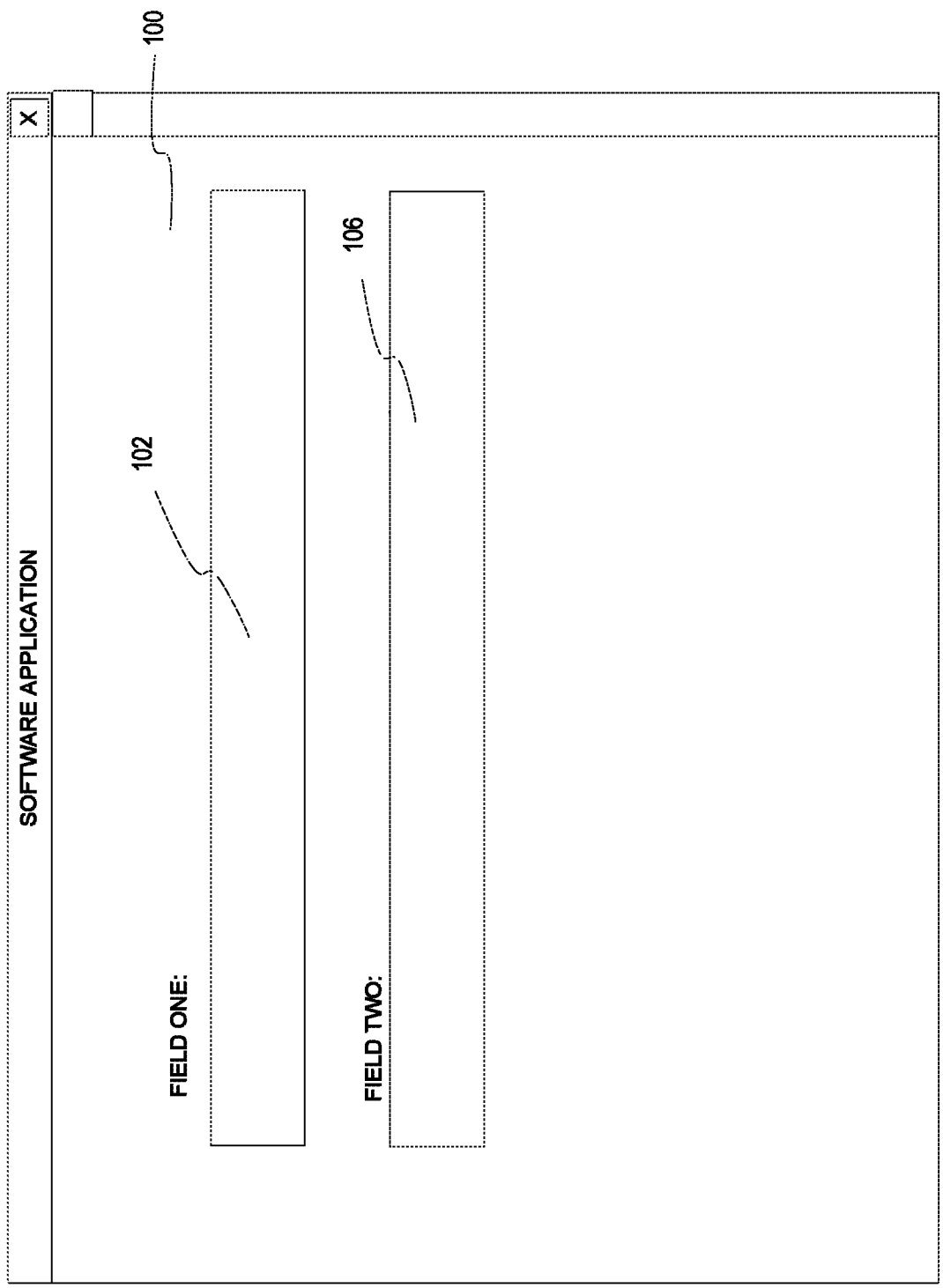
FIG. 5 illustrates one example of a screen display from a software application.

FIG. 5 illustrates one example of a software application which includes a screen display 100. Various form fields 102, 106 are shown. Another form of user interface includes using a display such as a touchscreen display on a remote device. Thus, for example, a user may select a particular form field and then may populate that field by speaking with the voice stream transcribed and placed within the field. Other type of on-screen controls may be used as well.

Therefore, methods and systems for voice dictation using multiple user interfaces have been shown and described. Although specific embodiments are shown here, it is contemplated that any number of options, variations, and alternatives may also be used. The present invention is not to be limited unduly to specifically what is shown and described herein.

What is claimed is:

1. A system for voice dictation by a user with an external auditory canal, the system comprising:
   an earpiece further comprising:
   an earpiece housing;
   a speaker disposed within the earpiece housing;
   a first microphone operatively connected to the earpiece housing and positioned to be isolated from ambient sound when the earpiece housing is fitted inside the external auditory canal;

a second microphone operatively connected to the earpiece housing and is positioned to capture sound external from the user;

a processor disposed of within the earpiece housing and operatively connected to the first microphone and the second microphone;

a plurality of different user interfaces operatively connected to the processor;

a transceiver operatively connected to the processor;

wherein the processor is adapted to capture a first voice audio stream associated with the user using at least the first microphone;

wherein the processor is further configured to capture a second voice audio stream associated with a person other than the user using at least the second microphone;

wherein the earpiece is configured to be controlled by the user through the plurality of different user interfaces to perform dictation;

wherein the plurality of different user interfaces comprises a gestural interface having at least one emitter and at least one detector operatively connected to the processor for detecting gestures performed by a user wherein the gestural interface receives user input in a form of at least one of taps and swipes and wherein the processor is configured to interpret the gestures as dictation commands;

wherein the plurality of different user interfaces further comprises an audio interface using at least one of the speaker, the first microphone, and the second microphone;

wherein the plurality of different user interfaces further comprises an inertial sensor operatively connected to the processor and wherein the processor is configured to interpret movement detected using the inertial sensor as dictation commands;

a software application executing on a computing device wherein the software application provides for receiving the first voice audio stream into a first position of record; and wherein the software application provides for receiving the second voice audio stream into a second position on record.

2. The system of claim 1 wherein the plurality of different user interfaces further comprises an accelerometer disposed within the earpiece housing and operatively connected to the processor.

3. The system of claim 1 wherein the first microphone is configured to detect bone vibrations associated with a speech of the user.

4. The system of claim 1 wherein the transceiver is an NFMI transceiver.

5. The transceiver of claim 4 where in the NFMI transceiver is used to communicate with a second earpiece.

6. The system of claim 1 wherein the computing device further comprises a display on a remote device.

7. The system of claim 1 wherein the earpiece further comprises at least one light emitting diode.

8. The system of claim 1 wherein the at least one emitter is an Infrared (IR) emitter.

9. The system of claim 8 wherein the at least one detector is an IR detector.

\* \* \* \* \*